United States Patent [19]

Heitmann

[11] Patent Number: 4,534,037
[45] Date of Patent: Aug. 6, 1985

[54] METHOD AND APPARATUS FOR SCRAMBLED PULSE-CODE MODULATION TRANSMISSION OR RECORDING

[75] Inventor: Jürgen Heitmann, Alsbach-Hähnlein, Fed. Rep. of Germany

[73] Assignee: Robert Bosch GmbH, Stuttgart, Fed. Rep. of Germany

[21] Appl. No.: 417,882

[22] Filed: Sep. 14, 1982

[30] Foreign Application Priority Data

Sep. 24, 1981 [DE] Fed. Rep. of Germany ....... 3138023

[51] Int. Cl.$^3$ ............................ H04K 1/06; H04N 7/16
[52] U.S. Cl. ................................... 375/25; 178/22.04; 178/22.06
[58] Field of Search ................ 375/2.1, 25; 178/22.01, 178/22.04, 22.05, 22.06, 22.1, 22.12, 22.13, 22.14, 22.15, 22.16, 22.17, 22.18, 22.19

[56] References Cited

U.S. PATENT DOCUMENTS

| | | |
|---|---|---|
| 3,970,790 | 7/1976 | Guanella ........................... 178/22.04 |
| 4,168,396 | 9/1979 | Best ................................. 178/22.06 |

FOREIGN PATENT DOCUMENTS

| | | |
|---|---|---|
| 1042011 | 10/1958 | Fed. Rep. of Germany . |
| 2619758 | 11/1976 | Fed. Rep. of Germany ... 178/22.17 |
| 364175 | 9/1981 | Fed. Rep. of Germany . |
| 3022573 | 12/1981 | Fed. Rep. of Germany . |
| 3022541 | 7/1982 | Fed. Rep. of Germany . |
| 1599155 | 9/1981 | United Kingdom . |

Primary Examiner—Joseph A. Orsino, Jr.
Attorney, Agent, or Firm—Frishauf, Holtz, Goodman & Woodward

[57] ABSTRACT

In order to emphasize particular spectral components of a sequence of digital signals transmitted or recorded in pulse-code words, "repacketed" words made up of one or more bits of one word of the original sequence and a complimentary number of bits from the next word are produced to provide a new series of words. The bits of alternate words are inverted before repacketing so that according to whether the alternation of bits in the new word is by bits, pairs of bits or quartets of bits in 8-bit words, for example, the quadruple sampling frequency, the double sampling frequency or the sampling frequency itself can be emphasized in the spectrum. Without the inverting of alternate words it is possible to transform the frequency spectrum downwards in frequency.

4 Claims, 4 Drawing Figures

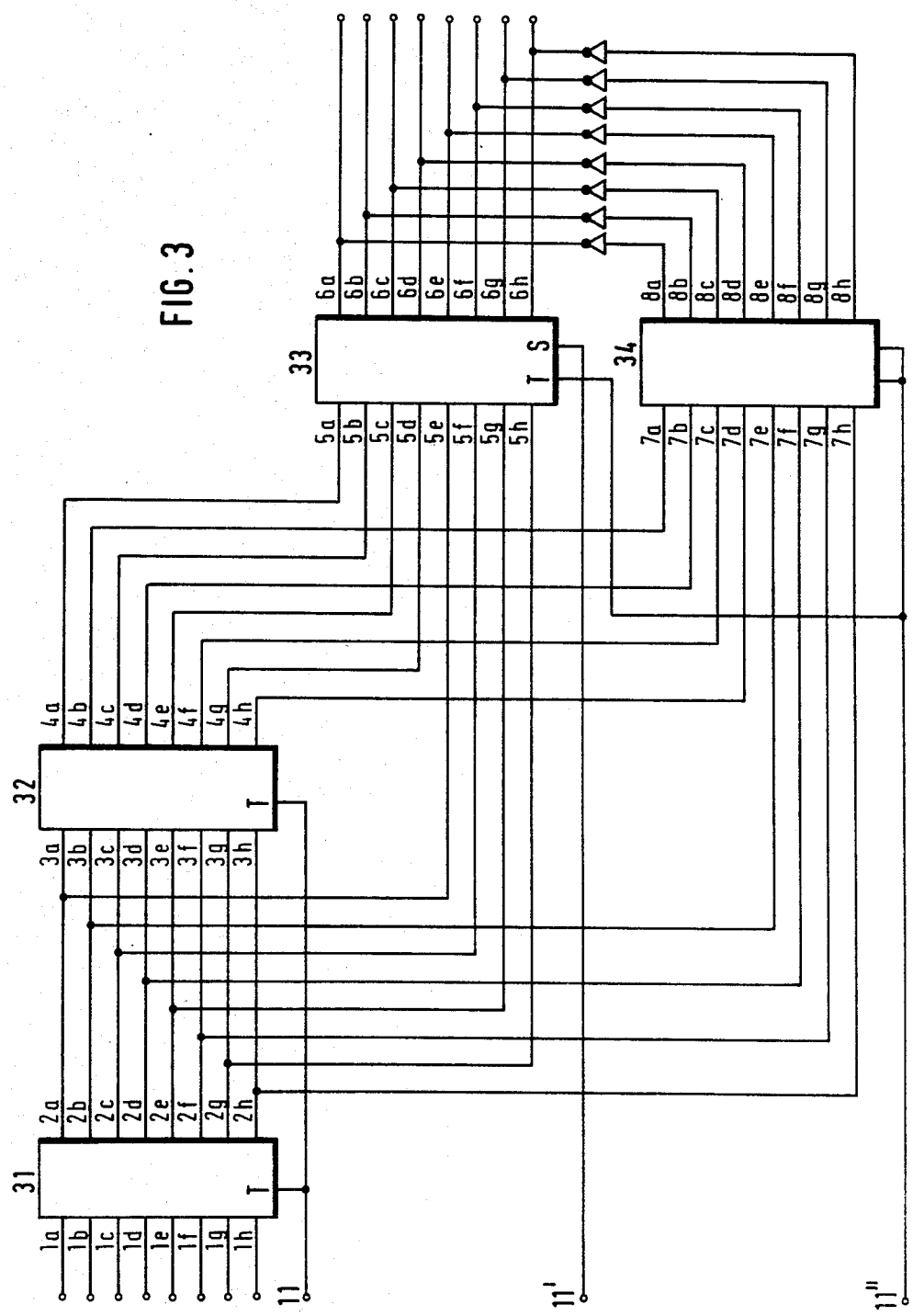

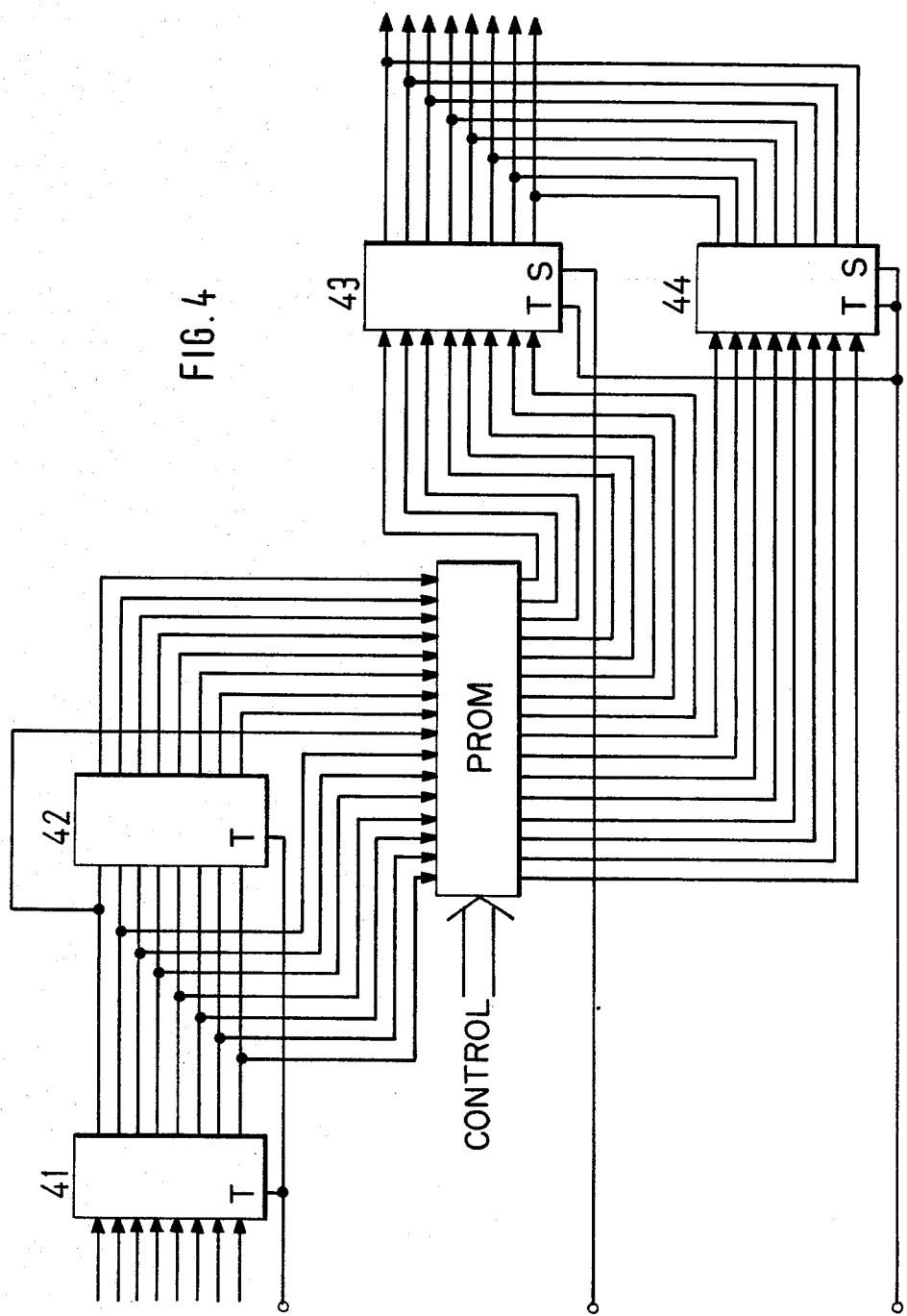

METHOD AND APPARATUS FOR SCRAMBLED PULSE-CODE MODULATION TRANSMISSION OR RECORDING

This invention concerns reencoding pulse code modulation signals and the converse decoding operation for improving the frequency characteristics of the signals for transmission or recording or for similar purposes.

Recording and transmission channels generally have frequency-dependent properties to which it is desirable to fit PCM signals to be recorded or transmitted by encoding signal samples into words of a suitable binary code, for example by utilizing a code other than the usual simple binary or reflective binary code. In this manner it is possible to a great extent to eliminate the d.c. component and other low frequency components of digital signals transmitted or recorded.

A simple way of obtaining freedom from the d.c. currents is to add to all signal segments of a particular size, for example to each data word, a number of bits of such a level that over the entire signal segment the number of L and H level bits cancel out. This trivial possibility is not used in practice, since in most cases the channel capacity is limited, so that transmission should take place with as little redundancy as possible.

Another known system or process is to invert the digital signals of alternate sample value as described by Goldberg et al in "Optical Television Link Employing a Digitally Modulated Laser", Journal of the SMPTE, Vol. 88, p. 414 sf. (June 1979). This process provides satisfactory results, however, only for limited contents of the signals to be transmitted.

In the choice or a recording or transmission code, however, not only the lower frequency band limit of the channel is important, but also the upper band limit and even sometimes the entire frequency transmission charcteristic of the passband.

SUMMARY OF THE INVENTION

It is an object of the invention to provide a method and apparatus for providing pulse code modulated signals in which the spectral distribution of the digital signals is to a great extent controllable and can therefore be fitted to the properties of a recording or transmission channel without difficulty.

Briefly, all the bits of alternate data words are inverted and successive non-overlapping pairs of data words are selected at half the sampling rate for interchange of a plurality, but less than all, of the bits of the respective words of a pair after inversion of the bits of one word of the pair, to provide modified pairs of words. The modified words of a pair are then transmitted sequentially to provide a continuous stream of modified words at the original sampling rate. In practice; each data word is stored "as is" for one intersample period in a first register and then stored in a second register for a second intersample period and inverted just before or just after storage in the second register. Similarly overlapping pairs of words in these two registers have their bits potentially interchanged (after inversion of one word of the pair) at each sampling clock pulse, but the third and fourth registers in which the modified words of each pair are stored are operated so that only the modified words of non-overlapping pairs are processed and transmitted. The converse operation is produced with similar equipment in reception or pick-up.

The method and apparatus of the invention has the advantage that the spectral distribution of the digital signals can be modified without inserting at supplementary redundance. With the use of a PROM it is possible to change the modification of the frequency spectrum from one kind to another quickly if desired, according to variations in the channel or in the make-up of the signals.

The system of the invention is particularly useful in recording and transmission of video signals, but other digitalized analog signals, as for example audio signals, are also capable of being processed in accordance with the invention to advantage. The present invention can further be advantageously combined with the system according to the prior pending application of the present inventor Ser. No. 361,528 filed Mar. 23, 1982, now U.S. Pat. No. 4,491,869 disclosing an advantageous way of encoding television signal samples.

BRIEF DESCRIPTION OF THE DRAWINGS

The invention is further described by way of illustrative example with reference to the annexed drawings, in which:

FIG. 3 is a circuit block diagram of apparatus for reconstituting the original signal sequence from a sequence produced by the apparatus of FIG. 2, and FIG. 4 is a circuit block diagram showing the use of a PROM for selectively changing the word repacketing pattern.

DESCRIPTION OF THE ILLUSTRATED EMBODIMENTS

Figure 1:
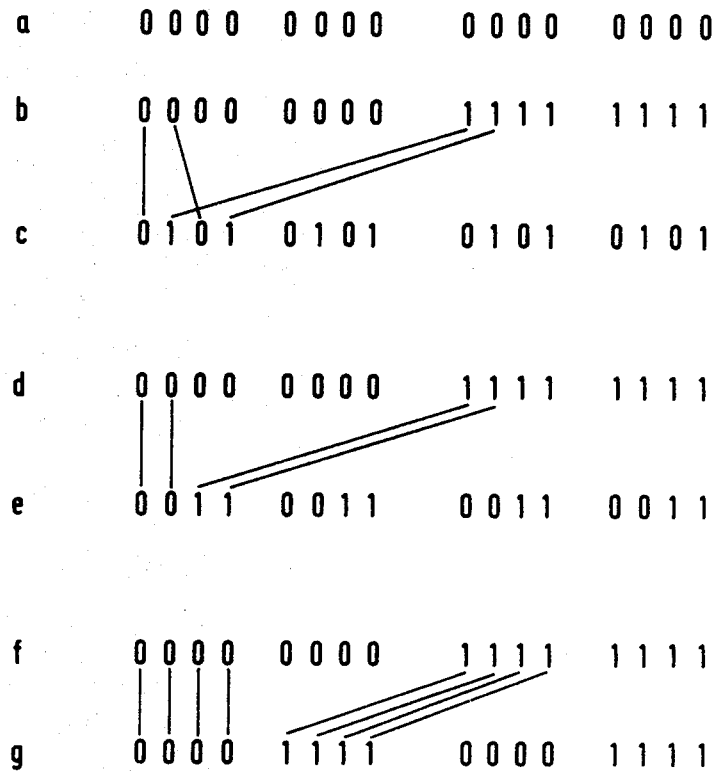
FIG. 1 is a tabular diagram illustrating a number of examples of repacketing data words of a sequence in accordance with the invention.

FIG. 1 illustrates various data words based on the coding of a television signal in which the data word 0000 0000 is provided for picture black. In the line a are two successive words for picture black resulting from coding samples of a television signal.

By inversion of every second sample value the data words illustrated in line b of FIG 1 result. Since in the case of television signals surfaces of the same or similar brightness often occur most of the sample values following one after the other in time are the same or similar, so that by the inverting of every second sample value half the sampling frequency is emphasized in the spectrum of the transmitted signal.

In line c of FIG. 1 a repacketing of the first and second sample values is performed in such a way that a bit from the first sample value, then a bit from the second sample value, then again a bit from the first sample value and so on is transmitted or recorded. Within a sampling period $T_s$ there are now four periods of the digital signal. In consequence the frequency which corresponds to the quadruple sampling frequency is emphasized.

Figure 2:
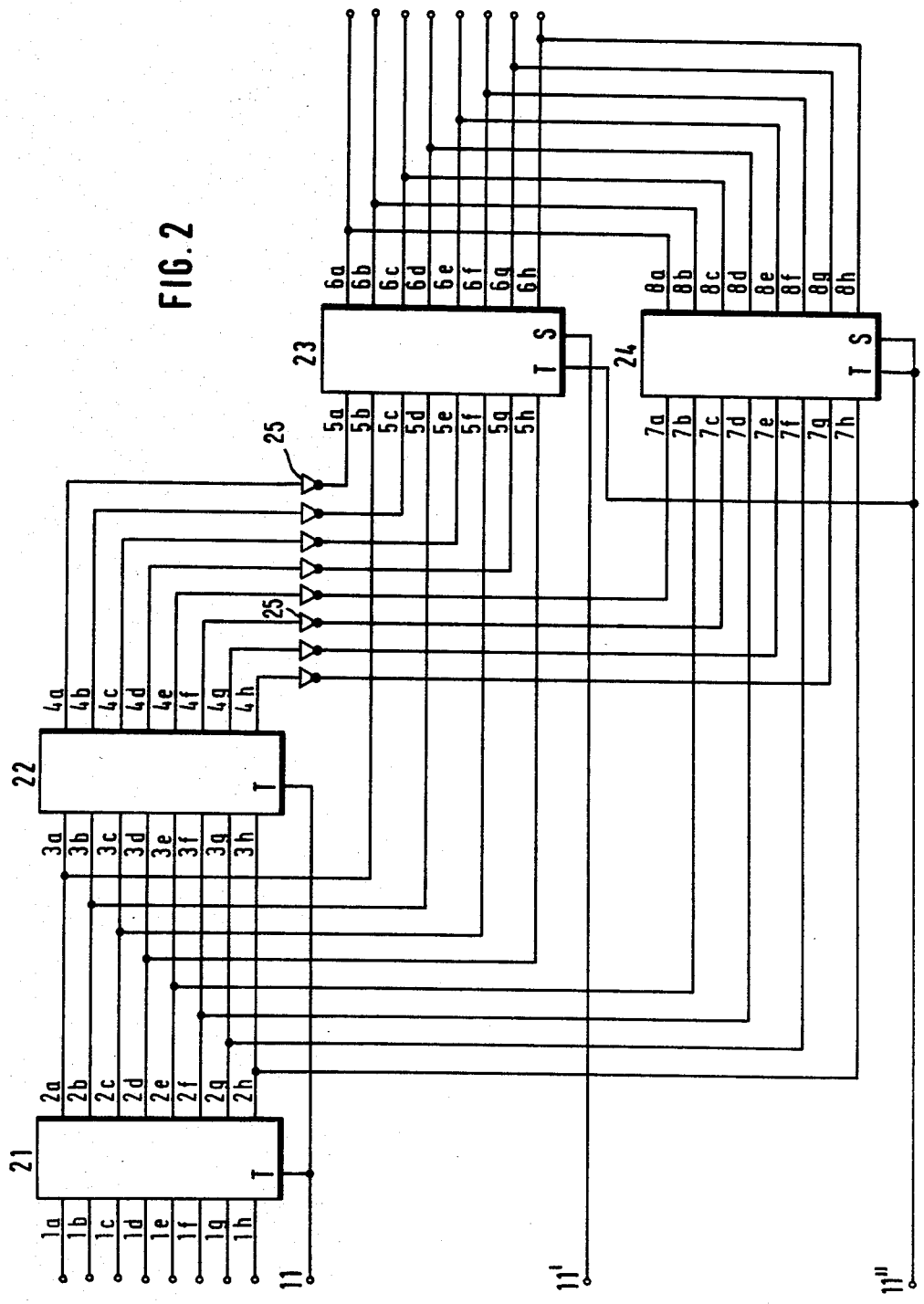
FIG. 2 is a circuit block diagram of apparatus for repacketing pulse-coded digital signals in accordance with the invention.

In lines d and e of FIG. 1 another repacketing of the sample values is illustrated and here two bits of the first and of the second sample values are successively transmitted. In consequence there is an emphasis on the double sampling frequency. In lines f and g of FIG. 1, finally, four bits of a sampling value are kept together in the rearrangement, so that an emphasis of the sampling frequency itself is produced. Putting the system of the invention into circuitry is quite simple with the components and circuits now known in digital electronics and is readily explained with reference to FIG. 2, 3 and 4. In FIG. 2 the blocks 21, 22, 23, 24 represent integrated circuit units respectively having inputs designated with the numerals 1, 3, 5 and 7 followed by one of the letters a–h differentiating the eight bit inputs of each where the signals present on the input lines are written into storage in the unit when a clock signal is provided at the input T, at which time the bits thus written in become available at the corresponding outputs 2a–2h, 4a–4h, 6a–6h and 8a–8h. Each one of these component units contains eight so-called D-flipflops. The inputs 1a–1h of the unit 21 receive the signal to be recorded or transmitted in 8-bit parallel form (which means that if the signals are originally sequential, they are converted into 8-bit parallel form by a suitable sequential-to-parallel converter). A clock signal is supplied at the additional input 11 for the clock signal input T of the unit 21 at a rate synchronized with the sampling rhythm used for sampling in a previous analog-to-digital conversion not illustrated in the drawing and, in the case of a television signal, the sampling rate is a frequency of typically 12 MHz for example. When a clock pulse appears, the signals present at the inputs are taken over into the storage cells of the unit 21 and become available on the one hand to the inputs 3a–3h of the unit 22 and on the other hand to every second input of each of the integrated circuit units 23 and 24, namely to the inputs 5b, 5d, 5f, 5h, 7b, 7d, 7f, and 7h.

The illustrated scheme, corresponds to line c of FIG. 1 as is further noted below.

After another clock pulse, the first sample value that was previously in the circuit unit 21 becomes stored in the circuit unit 22. In FIG. 2, for convenience of drawing, the bits are shown to be inverted after their exit from the output side of the circuit 22 by inverters 25, but of course these inverters could be provided just before the inputs to the unit 22 or could be built into the storage unit 22.

The outputs 4a–4h of the unit 22 are connected to the inputs of the circuit units 23 and 24 which have already been described as connected with the outputs of the circuit unit 21. The clock inputs T and the select inputs S of the circuit units 23 and 24 are connected respectively to the terminals 11′ and 11″ where clock pulses of half the sampling frequency are supplied, with those applied to the terminal 11′ being offset by half a clock period with respect to those applied to the terminal 11″. The outputs of the circuit units 23 and 24 are connected together as shown and provide the outputs of the "repacketing" system. At these outputs the storage content of the circuits 23 and 24 are alternately transmitted. Because of the described pattern of connection to the inputs of the circuits 23 and 24, the repacketing illustrated in line c of FIG. 1 is produced, as already mentioned. By otherwise chosen connections of the outputs of the circuit units 21 and 22 with the inputs of the circuit units 23 and 24, correspondingly different repacketing can be produced. It is even possible to make the repacketing patterns variable by corresponding switching over of the connections, for example by use of a programmable readonly memory (PROM) as illustrated in FIG. 4, which needs no further description in this regard.

FIG. 3 shows a circuit assembly for reconversion of the signals transmitted or recorded according to the invention into their original form of samples of, for example, a television signal each digitally encoded by some kind of a binary pulse code. The same kind of circuit units are used here as in the case of the system of FIG. 2 and their arrangement is likewise similar, this time involving the circuit units 31, 32, 33 and 34. The received or picked up signals are again supplied to the circuit in parallel form (it is understood that transmission or recording may have involved parallel-to-sequential conversion at the transmitting or recording end and sequential-to-parallel conversion at the pickup or receiving end). The 8-bit parallel words are stored in the storage cells of the circuit unit 31 with a clock pulse supplied at the terminal 11 and one clock period later they are stored in the circuit unit 32. The outputs of the circuit unit 31, in addition to being connected to the inputs of the circuit 32 are also connected to inputs of the circuit units 33 and 34 in a manner taking account of the repacketing that has been performed before recording or transmission and similarly the remaining inputs of the circuit units 33 and 34 are connected to the outputs of the circuit unit 32, so that the original data words can be reconstituted. The clock inputs T and select inputs S of the circuit units 33 and 34 are, again, connected to terminals 11′ and 11″ where clock signals of half the sampling frequency are supplied, those at one terminal being offset from those at the other by the sampling period. The outputs of one of the units 33 and 34 are inverted by the inverters 35, so that when these outputs are connected to the outputs of the other of these units the original data words in their original sequence will appear, timed by the clocking out by pulses at the select terminals of the units 33 and 34. It will be seen that where the system of FIG. 4 is used for varying the pattern of repacketing, the circuit configuration like that of FIG. 4 can be used at the receiving or pickup end, but it may be necessary to provide for transmission and recording in a distinct manner of the control signals for the PROM if the receiving or pickup system is to change its rearrangement of the scrambled work pairs as the pattern of repacketing used at the transmitting or recording end changes.

FIG. 4 also illustrates the fact that the inverting of the bits of alternate words is not essential to the practice of the invention. Although the repacketing of bits into words in accordance with the invention has been illustrated herein in a particularly useful combination with the inverting of the bits of every second sample word, in particular applications the word repacketing of the invention when used alone can produce useful results. Since in the case of a video signal picture surfaces are predominant in which successive data words representing light values differ from each other only little or not at all, the repacketing of the bits of word pairs in accordance with the invention without any inversion of alternate words leads to a reduction of all frequencies contained in the data signal. If the repacketing is carried out in such a way that each time a bit from the first sample and then a bit from the second sample and then again a bit from the first sample and so on is transmitted or recorded, the resulting signal has a data signal spectrum transformed down in a ratio of 2:1.

According to the special property of the recording or transmission channel or of the signal it can be convenient to repeat the inverting and/or the repacketing procedure, which is to say to take the words already repacketed once and repacket them again on the same or similar scheme, if desired with inversion of alternate words.

It will be noted that in the illustrated example the repacketing is done on a running system where each word becomes by stages the second word of a pair and then the first word of a pair, as contrasted with a simple interchange of bits between seperate pairs of words of a sequence which could possibly have some of the advantages of the invention in the result, but would require a more complicated assembly of circuits for operation and would involve a framing problem to identify the first and second words of each pair. The illustrated system is accordingly greatly preferable, both as a reliable method and as a compact apparatus for performinng the method.

Although the invention has been described with reference to particular illustrative examples, it will be recognized that variations and modifications are possible within the inventive concept. For example, in the practice of the invention, new words may be assembled each from bits drawn from three or more successive original words instead of from only two successive words, at the expense of providing an additional one or more one-word storage unit in each set of them.

I claim:

1. Method of processing video signals, for transmission or recording and reproduction in a single transmission or recording and reproduction channel, which signals have previously been encoded into a sequence of data words each of a first predetermined number (n) of pulse-code modulation (PCM) signal bits, which words sequentially correspond to periodic samples of said video signal obtained at successive instants definable by a sequence of clock pulses which also thereby define a sequence of intersample intervals, comprising the steps of:

providing first and second timing signal sequences for respectively defining the beginning of first and second sets of alternate intersample intervals of said sequence of intersample intervals;

inverting alternate words of said sequence in response to one of said timing signal sequences;

interchanging a second predetermined number (m), less than said first predetermined number (n) and greater than one, of bits of each successive pair of words of said data word sequence in response to one of said timing signal sequences and thereby forming a pair of modified words from each said successive pair of words of said data word sequence, and transmitting a first one of each of said pair of modified words in response to said first timing signal sequence and transmitting a second one of each said pair of modified words in response to said second timing signal sequence immediately following the transmission of the first modified word of the same pair of modified words and thereby producing a continuous stream of modified words obtained at the same rate as said periodic samples to which said data words correspond, said first and said second modified words of each pair being consistently distinguished from each other in all pairs according to which modified word contains the uninverted bits which were not interchanged in the bit-interchange step.

2. Method according to claim 1, in which the step of inverting is performed by successively storing each data word for one intersample interval successively in first and second registers, and inverting, before the interchanging step and after storage in said first register, all the bits of each data word, said interchanging step being then performed for successive pairs of words in response to successive clock pulses by distributing bits from said first and second registers to third and fourth modifiedword registers, an output of modified words derived from non-overlapping pairs of data words then being obtained in response to application of timing signals of said first and second timing signal sequences alternately to said third and fourth registers.

3. Method according to claim 1, in which said second predetermined number (m) is a factor of said first predetermined number (n).

4. Method according to claim 3, in which said second predetermined number (m) is half of said first predetermined number (n).

* * * * *